United States Patent [19]

Coluzzi

[11] Patent Number: 5,051,083

[45] Date of Patent: Sep. 24, 1991

[54] PLANT FOR MANUFACTURING A MOLD IN THE FORM OF A MULTIPLE-IMPRESSION PLASTIC PLATE FOR REPRODUCING INTAGLIO PRINTING PLATES

[75] Inventor: Antonio Coluzzi, Lurago Marinone, Italy

[73] Assignee: De La Rue Giori S.A., Lausanne, Switzerland

[21] Appl. No.: 487,528

[22] Filed: Mar. 2, 1990

Related U.S. Application Data

[63] Continuation-in-part of Ser. No. 311,534, Feb. 15, 1989, abandoned.

[30] Foreign Application Priority Data

Mar. 28, 1988 [CH] Switzerland ........................ 1164/88
Feb. 19, 1990 [EP] European Pat. Off. ........ 90810117.3

[51] Int. Cl.[5] ............................................. B29C 35/08

[52] U.S. Cl. .............................. 425/174.8 R; 264/25; 264/226; 264/322; 425/385; 425/397; 425/407

[58] Field of Search .................. 264/25, 26, 220, 225, 264/226, 293, 294, 296, 322, 101, 227; 425/385, 397, 407, 174.6, 174.8 R, 174.8 E

[56] References Cited

U.S. PATENT DOCUMENTS

| | | | |
|---|---|---|---|
| 1,991,009 | 2/1935 | Browne et al. | 264/225 X |
| 2,463,289 | 3/1949 | Leguillon | 425/174.8 X |
| 2,754,606 | 7/1956 | Williams | 264/226 X |
| 2,920,172 | 1/1960 | Stallard | 264/293 X |
| 3,101,668 | 8/1963 | Leeds | 264/226 X |
| 3,697,657 | 10/1972 | Kisker et al. | 264/322 X |
| 4,285,744 | 8/1981 | Rudolf et al. | 264/220 X |

FOREIGN PATENT DOCUMENTS

| | | | |
|---|---|---|---|
| 53-105558 | 9/1978 | Japan | 264/293 |
| 57-63213 | 4/1982 | Japan | 264/293 |
| 59-52632 | 3/1984 | Japan | 264/225 |
| 59-194846 | 11/1984 | Japan | 425/397 |
| 62-152710 | 7/1987 | Japan | 264/227 |

*Primary Examiner*—Richard L. Chiesa
*Attorney, Agent, or Firm*—Kane Dalsimer Sullivan Kurucz Levy Eisele and Richard

[57] ABSTRACT

The impressions are produced using an original plate (19) bearing a design by the following steps: a plastic plate (4) made of thermodeformable material is prepared and placed, in an adjusted position corresponding to the location of the first impression to be produced, between an electrode (7), the outline of which corresponds to the periphery of the design and which is surrounded by an insulating border (24), and the original plate (19) which forms a second electrode; the first impression is produced on the plastic plate (4) by high-frequency heating of the plastic plate (4) via the electrodes, and by compression; the plastic plate (4) is then cooled, the original plate (19) is separated from the plastic plate (4) that is displaced successively in the other adjusted positions corresponding to the other impressions to be produced and, in each position, the heating, compression and cooling steps are repeated in order to reproduce the next impression.

10 Claims, 6 Drawing Sheets

FIG. 4
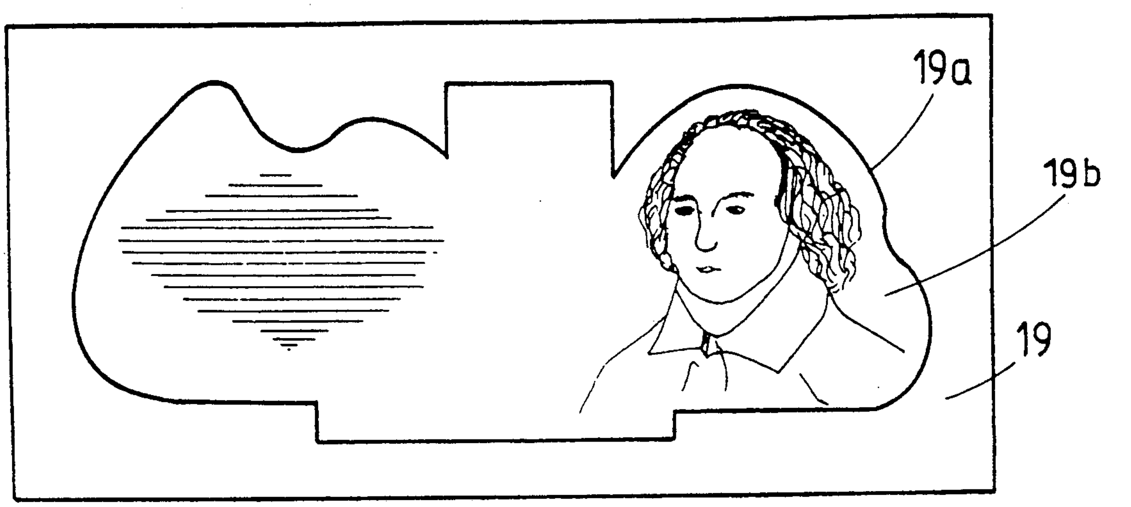
FIG. 5
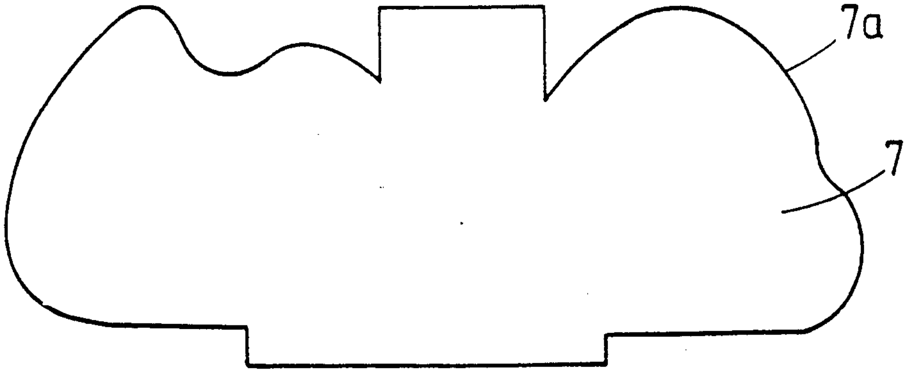
FIG. 6
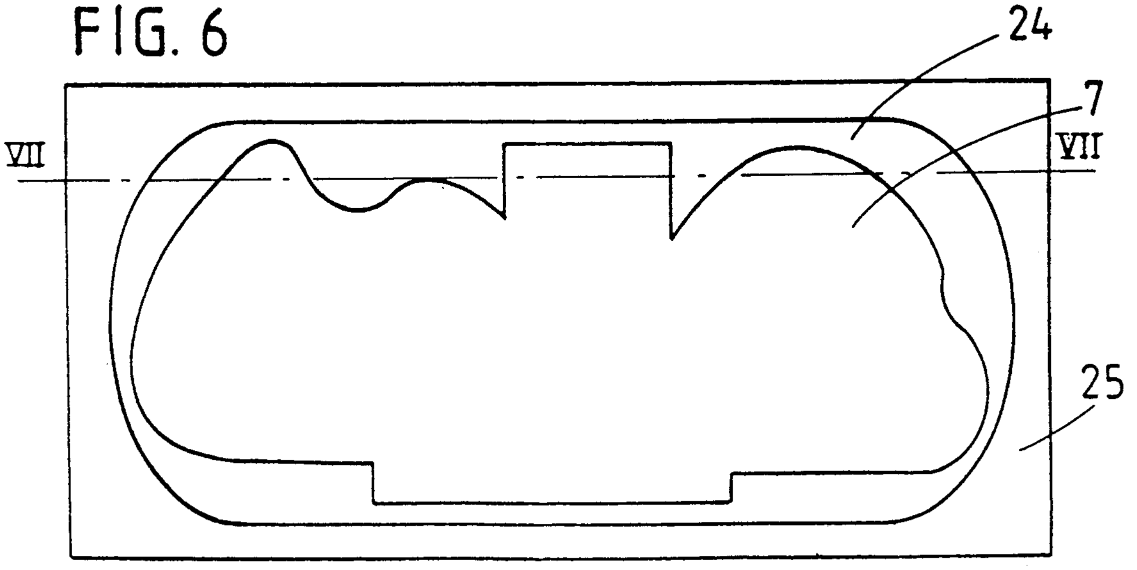
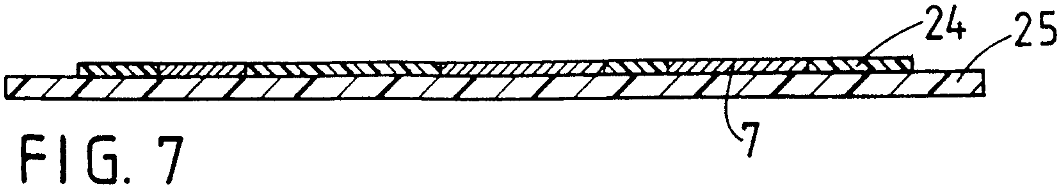
FIG. 7

PLANT FOR MANUFACTURING A MOLD IN THE FORM OF A MULTIPLE-IMPRESSION PLASTIC PLATE FOR REPRODUCING INTAGLIO PRINTING PLATES

This is a continuation-in-part of co-pending application Ser. No. 311,534 filed on Feb. 15, 1989, now abandoned.

FIELD OF THE INVENTION

The present invention relates to a plant for manufacturing a mold in the form of a multiple-impression plastic plate for reproducing intaglio printing plates, according to which the said impressions are produced using an original plate of metal by means of compression molding with heating of the plastic plate. Said printing plates are intended for sheet-fed intaglio printing.

PRIOR ART

It is known to manufacture intaglio printing plates using an original metal plate on which there has been carefully engraved the image to be reproduced consisting of engraved lines and zones of varying depths. Since the intaglio printing plate arranged on the plate cylinder has several identical impressions, in particular in the case where bank notes are printed, arranged in perpendicular rows, the impression must be multiplied and transferred onto the intaglio printing plate which is generally made of nickel. In order to multiply and transfer the impressions, the following procedure is used:

A plate made of thermoplastic material, the size of which corresponds to the size of the original plate and with a thickness of about 0.5 to 0.7 mm, is taken, and this plate is arranged in a press between a flat support provided with means for being heated, and the engraved surface of the original plate. The plate made of thermoplastic material is heated to a temperature of about 150°-170° and the original plate is applied by means of the punch of the press at a pressure of about 100 to 200 kg/cm$^2$. After this operation, the plate made of thermoplastic material will bear the complementary relief of the image engraved on the original plate and a positive plastic mold, also called a male matrix or an upper matrix, is thus obtained Subsequently, the pressure is eliminated, the original plate is withdrawn and the positive mold is allowed to cool, this cooling operation being effected naturally or by suitable means.

These stages will be repeated as many times as there are impressions on the intaglio printing plate, thus being a long and laborious operation.

In order to obtain a mold having the shape of the positive plate corresponding to the intaglio printing plate, the following procedure is used:

The edges of each positive mold are carefully cut so as to obtain a mold with predetermined dimensions. Then, all the positive molds are temporarily bonded onto a flat support, arranged precisely relative to each other and introduced into a plastic welding machine in which the joining lines between the adjacent positive molds are welded, thus producing a mold in the form of a multiple-impression positive plastic plate. This positive plate must be polished and treated so as to remove the excess from the weld joints and obtain a smooth and continuous surface between the impressions.

This method is long and complicated and requires special precision machinery. The positive plate must be made up with great care from the positive molds so as to ensure the register for printing subsequently.

Using the multiple-impression positive plastic plate to obtain the intaglio printing plate, a known method is as follows:

A layer of silver is applied onto the positive plate and a layer of copper is deposited on the silver-lined surface by means of electrolysis. By withdrawing the positive plastic plate, a negative copper plate, also called a female matrix or lower matrix, which comprises the engraved impressions, is obtained The surface of this negative plate between the impressions must be machined so as to ensure that it is completely smooth and continuous. Using this negative copper plate, a positive nickel plate is reproduced, followed by a negative nickel plate, which is the actual intaglio printing plate which will be mounted on the plate cylinder. This plate must also undergo a finishing treatment so as to ensure, on the one hand, that the surface between the impressions is smooth and continuous and, on the other hand, that the rear of the plate in contact with the plate cylinder is also perfectly smooth and continuous. In order to increase the resistance to wear of the intaglio printing plate, a layer of chrome is applied.

The object of the present invention is the manufacture of a mold in the form of a multiple-impression plastic plate which serves as a base for manufacturing the intaglio printing plate having a given number of identical impressions, in a simpler and improved manner. The mold in the form of a multiple-impression plate may be a positive mold or a negative mold.

SUMMARY OF THE INVENTION

The plant according to the invention is used to perform the following steps:

a) a plastic plate made of material being deformable by means of compression molding is prepared, the said plate having essentially the dimensions of the intaglio printing plate required;

b) a first plate electrode, the outline of which corresponds to the periphery of the design of the original plate and therefore of the impression to be produced, is prepared;

c) the edge of the said first plate electrode is surrounded by an insulating border, the inside edge of which is adapted to the said outline and the thickness of which is equal to the thickness of the said first plate electrode;

d) the said plastic plate is placed, in an adjusted position corresponding to the location of the first impression to be produced, between the first plate electrode and the original plate which is used as a second plate electrode;

e) the two electrodes are brought near to the said plastic plate and the latter is subjected to high-frequency heating by producing, between the two electrodes, a high-frequency field for a given period of time until the plastic plate has reached a temperature suitable for molding;

f) the first impression is produced on the plastic plate by compressing the latter for a given period of time;

g) once this period has lapsed, the plastic plate is cooled;

h) the electrodes are separated and relative displacement is effected between, on the one hand, the plastic plate and, on the other hand, the electrodes, successively in the other adjusted positions corresponding to the other impressions to be produced and, in each position, the steps e) to g) are repeated in order to reproduce the next impression.

The advantages of this method are as follows. The mold in the form of a multiple-impression plastic plate is manufactured continuously without having to form, as previously, the multiple-impression plate by assembling separate molds requiring precise cutting and assembly, and processing of the joints in order to remove the excess weld is also avoided. The fact that the heating is performed by high frequency enables the pressure required during compression of the original plate on the plastic plate to be reduced.

The use of high-frequency heating ensures not only more rapid and more uniform heating but, by virtue of a plate electrode whose outline corresponds to the periphery of the design and by virtue of the insulating border surrounding this electrode, also affords in particular the advantage that the heating is more easily confined to the region of the impression to be produced. In fact, during the heating of the plastic plate, it has proved essential that, as far as possible, only this zone of the impression to be produced is heated and not the adjacent regions, in order to prevent the latter from being deformed during the molding operation. The plastic plate beyond the impression zones should remain absolutely plane so that this multiple-impression plastic plate can serve, without subsequent treatment of the surface, for reproducing the intaglio printing plates, as mentioned in the introduction.

If the plastic plate is heated by conventional means, for example electrically or by circulation of a hot fluid, it is virtually impossible to prevent this adjacent zone from being heated as well; for this reason, with the conventional methods, to prevent such heating of the adjacent zone, it is absolutely necessary to limit the temperature of final heating, which consequently makes it necessary to work with a greater pressure during the molding. In contrast, with the method according to the invention, since the heated region is limited to the required zone, it is possible to work with higher temperatures, thereby enabling a reduction in the pressure during the molding. Whereas, according to the conventional methods, a temperature of about 150° to 170° C. and a pressure of 100 to 200 kg/cm$^2$ are used, with the method according to the invention it is possible to heat the plate up to a temperature of about 200° C. and apply a pressure of about 20 kg/cm$^2$.

Preferably, the electrodes are preheated before being brought into contact with the plastic plate and, in addition, it is advantageous to place a thin insulating layer of a rigid material, preferably mica, on the first electrode and its border.

A plant for performing the above steps constructed in accordance with this invention. This plant comprises a structure provided with an electrode-carrying device for supporting the first plate electrode and with a plate-carrying device for supporting the original plate at a distance from and opposite to the said first electrode; this first plate electrode has an outline which corresponds to the periphery of the design of the original plate and therefore of the impression to be produced; the edge of the said first electrode is surrounded by an insulating border, with the inside edge adapted to the said outline and of thickness equal to that of the said first plate electrode, the said first electrode being carried by an insulating support, the said original plate forming a second plate electrode, the two electrodes being connected to a high-frequency apparatus; there is provided, arranged between the said electrodes, a sliding frame provided with means for supporting the plastic plate made of deformable material, having approximately the dimensions of the intaglio printing plate required; and there are provided means for effecting relative displacement between the sliding frame and the said electrodes in two perpendicular horizontal directions and means for changing the distance between the said electrode-carrying and plate-carrying devices.

BRIEF DESCRIPTION OF THE DRAWINGS

The two exemplary embodiments of the plant constructed in accordance with this invention will be described with the aid of the accompanying drawing.

FIG. 4 is a plan view of an original plate showing a diagrammatic illustration of the design and the outline, or periphery, which surrounds the zone of design and this outline is of course imaginary and has been shown only for the sake of the description.

FIG. 5 shows the plate electrode having an outline corresponding to that of the design.

FIG. 6 is a view of the same electrode, but placed on an insulating support and surrounded by an insulating border.

FIG. 7 is a sectional view along VII—VII of FIG. 6.

DESCRIPTION OF THE PREFERRED EMBODIMENTS

Figure 1:
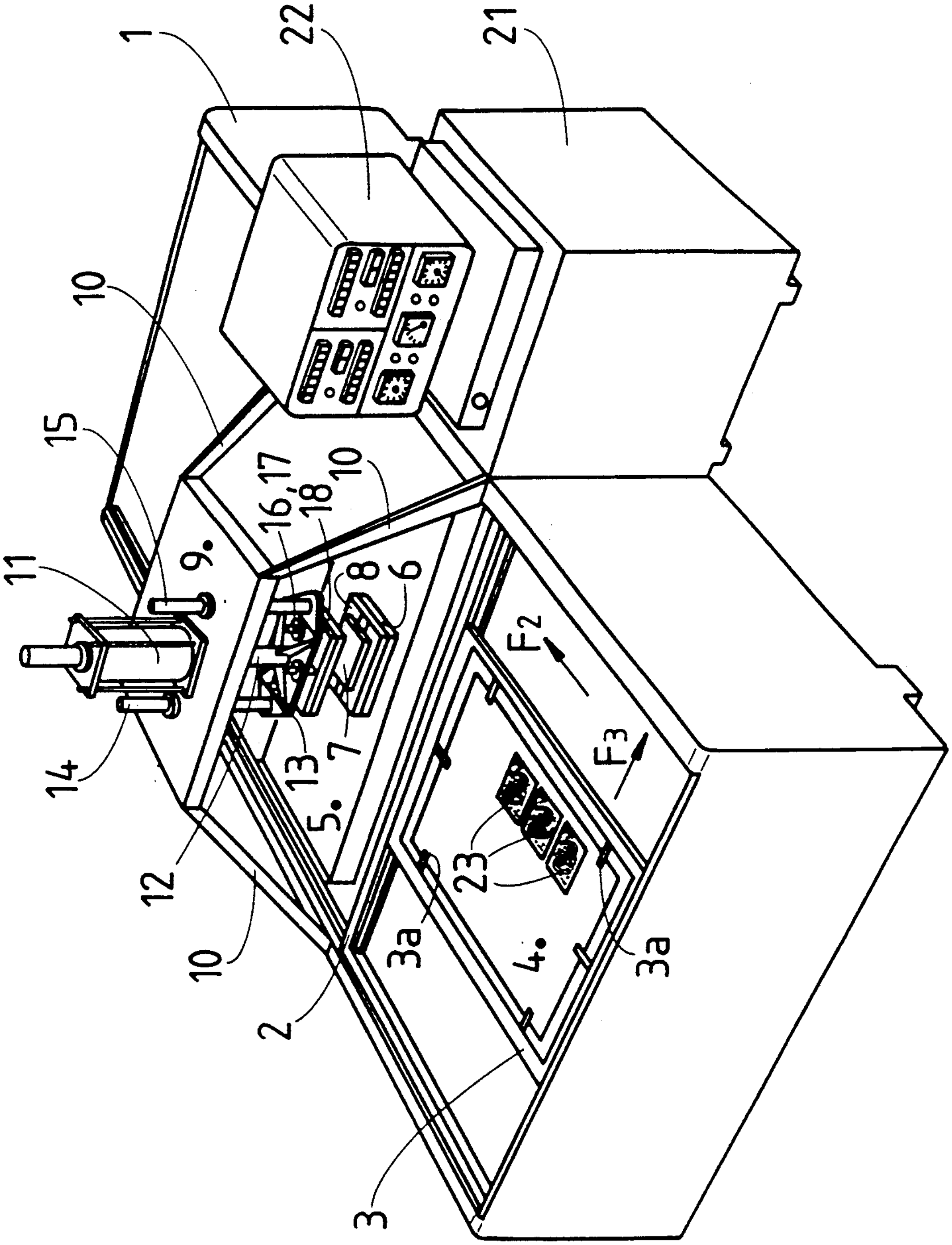
FIG. 1 is a perspective view of a first form of embodiment of the plant.

The plant according to FIG. 1 comprises a structure 1 serving as a base for the remainder of the plant. A first sliding frame 2 displaceable in a horizontal direction F2 is mounted on the structure 1. A second sliding frame 3 is mounted inside the sliding frame 2 and is displaceable inside the latter in a direction F3. A plastic plate 4, which is fixed by clamps 3*a* and will form the multiple-impression mold, is placed inside the second sliding frame 3. A few impressions 23 are indicated in FIG. 1.

Figure 2:
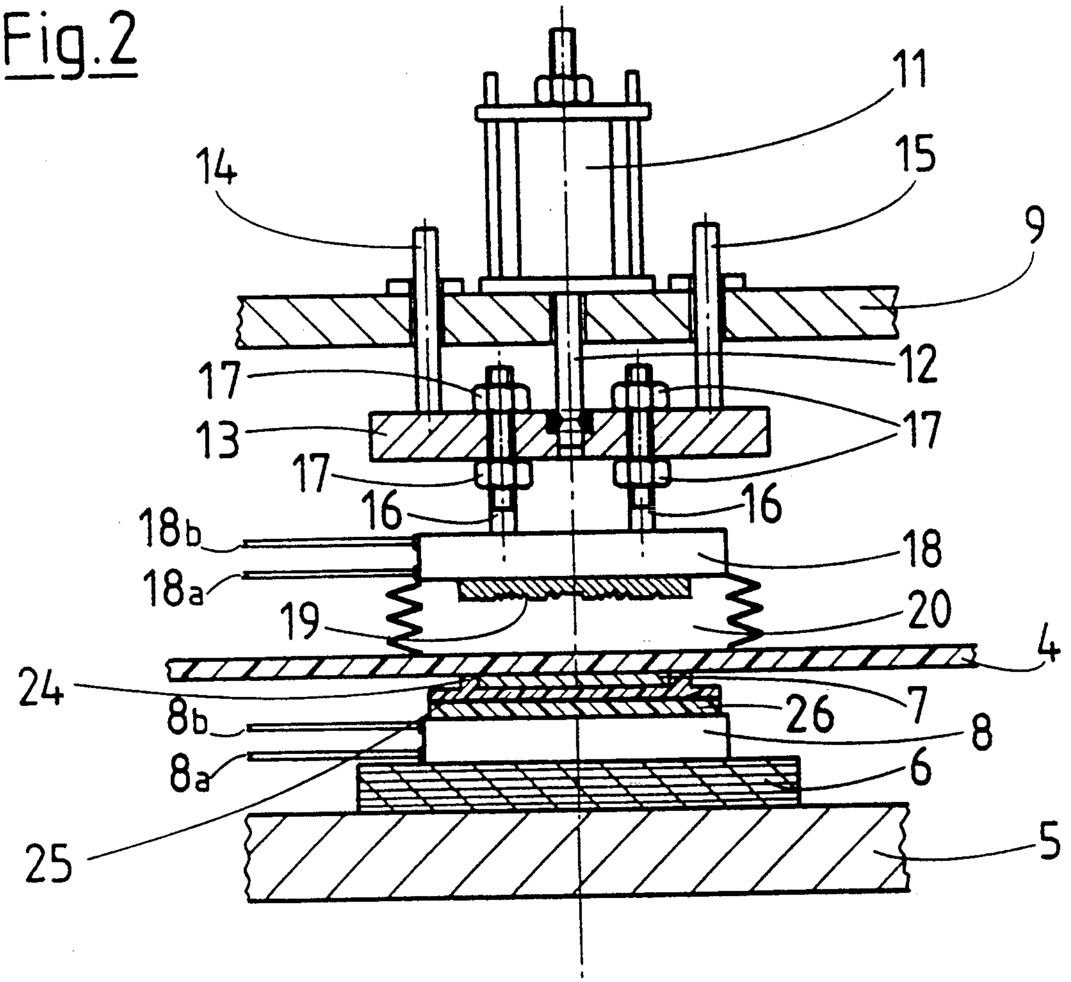
FIG. 2 is a partial and enlarged side view of the plant.

In the middle of the region in which the first sliding frame 2 moves, and below the sliding plane, is arranged the electrode-carrying device. As shown in FIG. 2, this device comprises a support saddle 5 integral with the structure 1, on which there is arranged an insulating plate 6 supporting a heating and cooling device 8 consisting of a flat metal box in which a liquid can circulate and which is provided for this purpose with two pipes 8*a* and 8*b* for the inlet and outlet of the hot or cold liquid as required. An insulating plate 26, on which there is arranged an insulating support 25 carrying a first plate electrode 7, rests on this heating and cooling device 8. The arrangement and the configuration of this electrode 7 will be described in greater detail on the basis of FIGS. 4 to 7.

In line with the electrode 7 there is located a plate-carrying device for fixing the original plate 19 which, in the example under consideration, has an engraved design on it. This original plate 19 is used as a second electrode. The said plate-carrying device is installed by means of a framework 10 which, in the example illustrated in FIG. 1, comprises four slanting legs and an upper plate 9. A double-acting jack 11 is fixed onto this plate 9 and the rod 12 of the piston of the said jack passes through the plate 9 and carries, on its bottom end, the plate-carrying device. The latter consists of a support plate 13 provided with two guiding rods 14, 15 extending parallel to the rod 12 of the jack 11 and passing through the upper plate 9. The actual plate carrier carrying the original plate 19 is suspended via four threaded rods 16 provided with nuts 17 for adjusting the level. This plate carrier constitutes both a heating and cooling device 18 consisting of a flat metal box provided with two pipes 18*a* and 18*b* serving as an inlet and outlet for the hot or cold liquid as required.

A chamber 20, inside which a relative vacuum may be created, is arranged below the device 18. This chamber 20 consists of a bellows, the top end of which is integral with the device 18 and the bottom end of which is in close contact with the plastic plate 4.

Finally, on a console 21 there is arranged a high-frequency apparatus 22 as well as various controls enabling, for example, the sliding frames 2 and 3 to be displaced and the jack 11 to be controlled. In the example illustrated in FIGS. 1 and 2, the electrode 7 is connected to the live terminal of this high-frequency apparatus 22 whereas the original plate 19 is grounded, i.e. is in contact with the device 8 made of metal and the other elements of the metal structure 1.

FIG. 4 shows the original plate 19 with an engraved design 19*b* which extends over an irregular zone marked by an outline forming the periphery 19*a* of this engraved zone. Of course, this outline does not exist in reality, it is indicated in FIG. 4 in order to illustrate the boundary of the design clearly.

FIG. 5 shows the electrode 7 cut in such a manner that its outline 7*a* corresponds to the periphery 19*a*. This electrode 7, which is preferably a sheet of copper about 0.5 mm thick, is fixed, according to FIGS. 6 and 7, for example by bonding, onto an insulating support 25 about 1.5 to 2.0 mm thick, and is surrounded by an insulating border 24 which is bonded onto the insulating support 25 and the inner edge of which has the shape of the outline of the electrode 7 and therefore fits around the edge of the latter. The border 24 has the same thickness as that of the electrode 7, their surfaces are therefore in the same plane (FIG. 7).

The insulating support 25 and the border 24 are made of an electrically and thermally insulating material, preferably glass fiber-reinforced silicone, and cut out of an elastic strip. In the example under consideration, the border 24 is a part distinct from the insulating support 25 and only surrounds the region adjacent to the electrode 7 without covering the entire surface of the insulating support 25, the dimensions of which correspond approximately to the original plate 19 or are slightly larger. The minimum width of the border 24 should be about 5 mm to ensure both good support for the plastic plate 4 around the impression during the molding and good electrical and thermal insulation, so that the heating is concentrated exclusively on the zone defined by the outline 7*a* of the electrode 7. Under these conditions, any deformation of the surface of the plastic plate around the impression is prevented and perfect planeness beyond the impressions is guaranteed, this planeness being essential for the subsequent manufacturing of the intaglio printing plates.

Since the insulating support 25 is flexible and relatively thin, provision has been made, according to FIG. 2, for a further insulating plate 26 made of rigid material, for example bakelite, 4 to 5 mm thick, which is therefore placed between the device 8 and the insulating support 25 to prevent dissipation of the high-frequency energy and to provide good support.

The electrode 7 can be connected to the high-frequency apparatus 22 (not shown in the drawings) via the insulating support 25.

Figure 3:
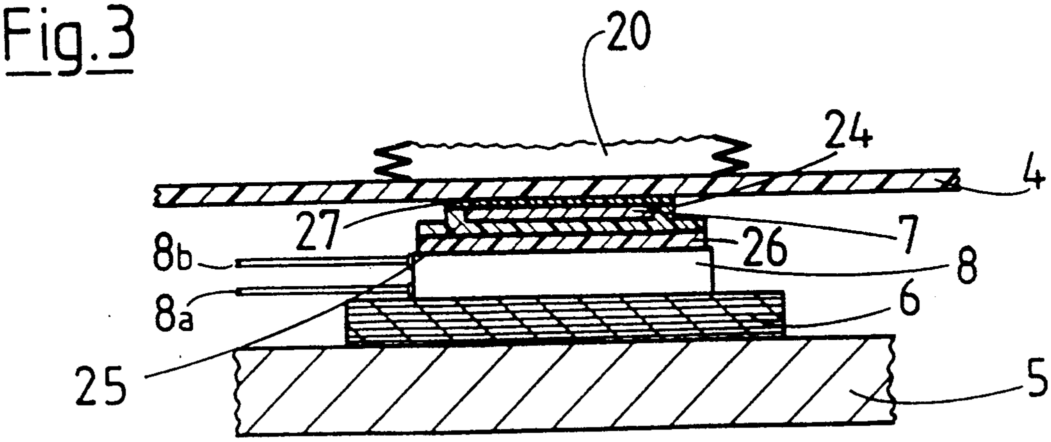
FIG. 3 is an enlarged side view of a variation of the plant.

According to the variation of FIG. 3, a rigid insulating thin plate 27, preferably made of mica, having a thickness of about 0.7 to 1.0 mm, is placed on the said electrode and its border 24. This arrangement ensures a perfect impression and prevents the join between the edge of the electrode 7 and its border affecting the quality of the impression.

Figure 8:
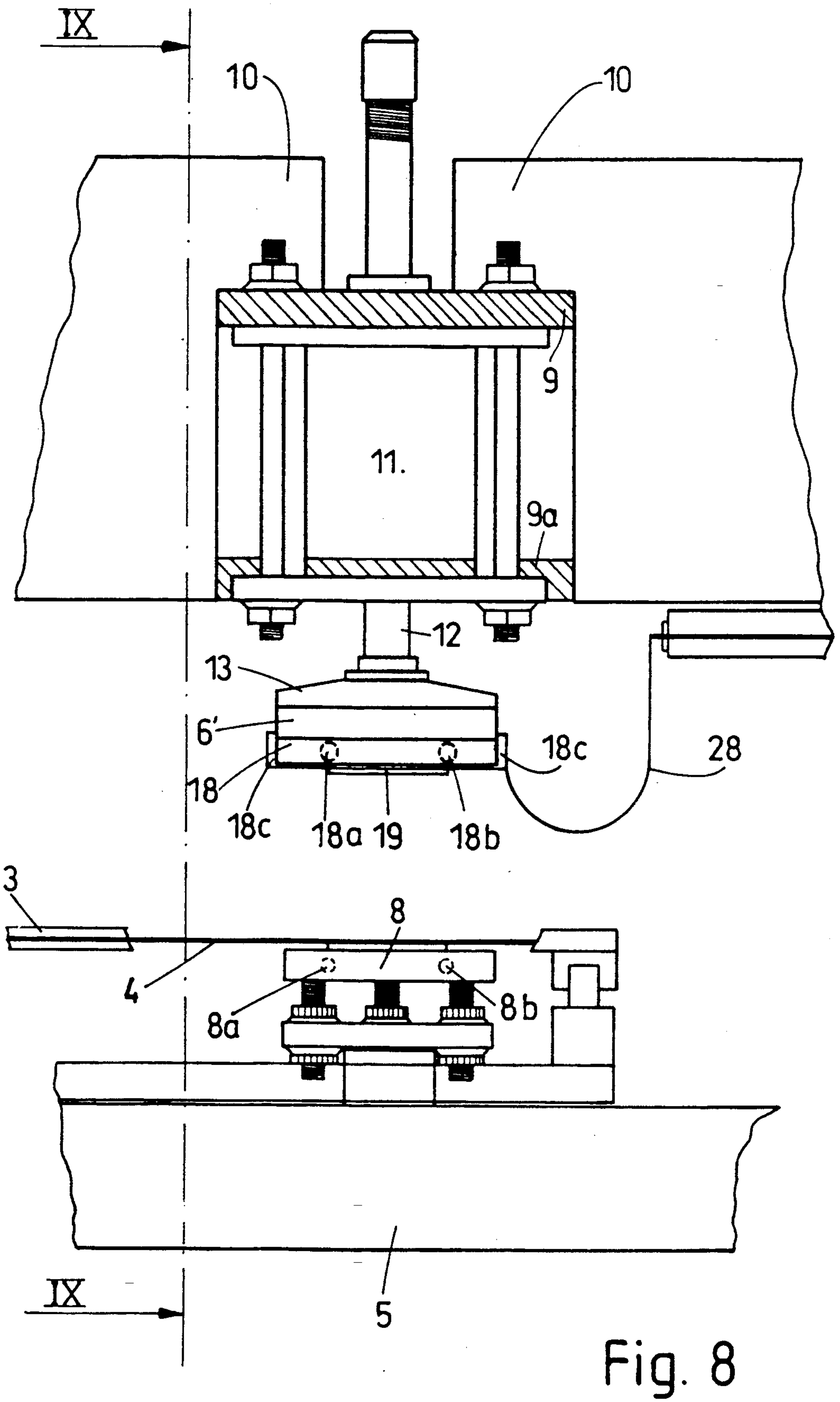
FIG. 8 shows a second form of embodiment of the plant, illustrating only the elements essential for the invention.
Figure 9:
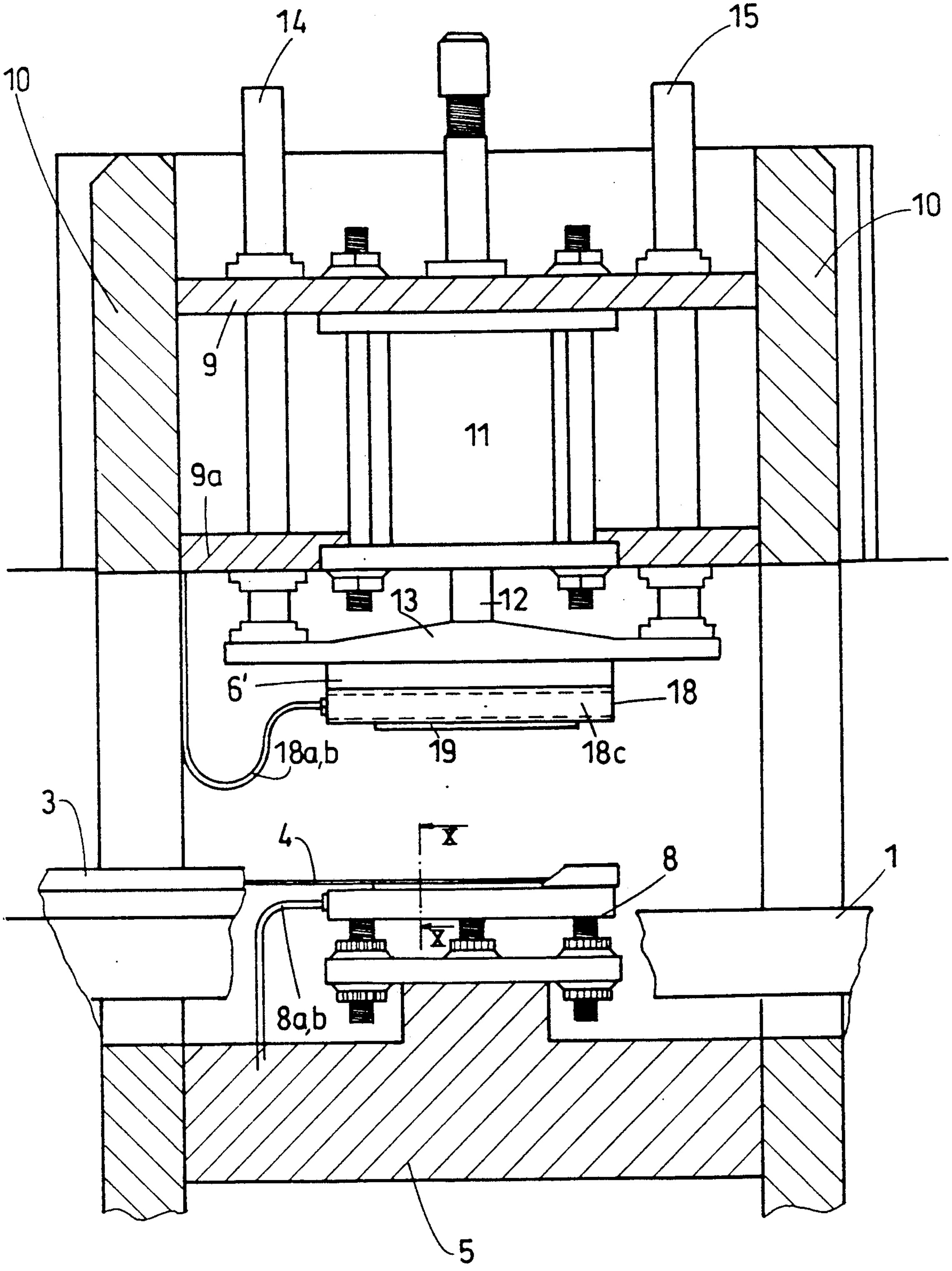
FIG. 9 is a view in the direction of the arrows IX—IX of FIG. 8.
Figure 10:
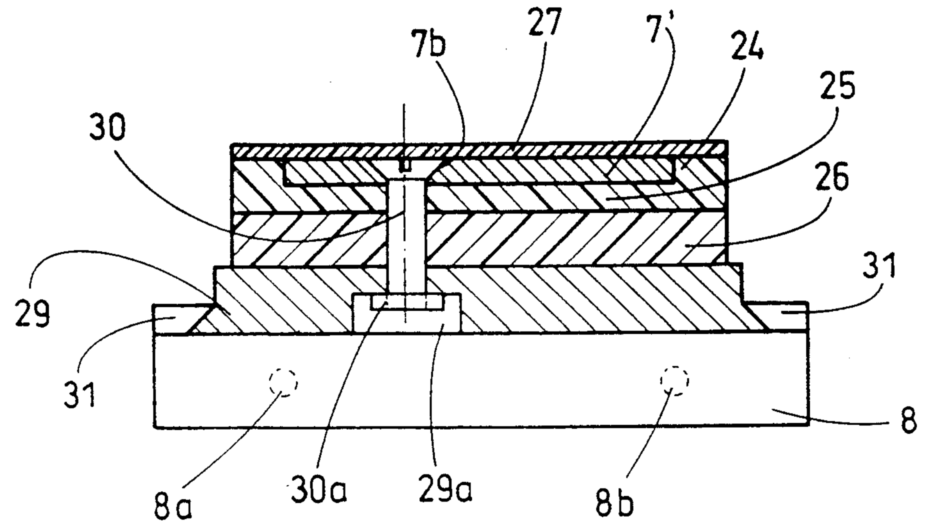
FIG. 10 is a sectional view of the electrode-carrying device of FIGS. 8 and 9, along X—X of FIG. 9, to an enlarged scale.

FIGS. 8 to 10 show a second form of embodiment of the plant, in which it is the original plate 19 which is connected via a copper strip 28 to the live outlet of the high-frequency apparatus 22. The jack 11 is installed on the framework 10 by means of plates 9, 9*a*, and the supporting plate 13, provided with the guiding rods 14, 15, is suspended from the end of the rod 12 of the piston of the said jack (FIG. 9). Fixed to this supporting plate 13, by means of an electrically and thermally insulating plate 6′, is the plate carrier consisting of the heating and cooling device 18 provided with the pipes 18*a*, 18*b*. The fixing of the original plate 19 is effected by means of a supporting frame 18*c* in metal contact with the device 18 in such a manner that the device 18/original plate 19 assembly form the high-potential electrode in this case, the copper strip 28 being fixed to this frame 18*c*. The plant according to FIGS. 8 and 9 works without a vacuum chamber.

As far as the electrode carrier is concerned, it again comprises a heating and cooling device 8 consisting of a flat box which is provided with two pipes 8*a*, 8*b* for the circulation of the hot or cold liquid and is positioned, without any insulation, on the support saddle 5 by means of a three-point support.

FIG. 10 shows the exact arrangement of this electrode carrier. In this case, provision is made for a metal plate 29 supporting the insulating plate 26 on which there is arranged the insulating support 25 carrying the electrode 7′ surrounded by the insulating border 24 which forms one piece with the said support 25. The entire assembly is preassembled by means of screws 30 which pass through these elements and the bottom end of which emerges in a housing 29*a* of the metal plate 29 and is screwed into a nut 30*a*. The head of the screws 30 is embedded in conical holes 7*b* formed in the electrode 7, so that these screws 30 are flush with the surface of the electrode. A mica plate 27 is also provided on top of the electrode 7 and its border 24. The metal plate 29 has inclined edges enabling it to be fixed to the device 8, together with all of the other elements, by means of winches 31 which likewise have inclined faces and clamp the said inclined edges of the metal plate 29. With this arrangement, the electrode 7, is grounded by means of the screws 30, the device 8 and the structure.

The insulating part forming the support 25 and the border 24 is preferably a flexible plate made of silicone, with a thickness of 2 to 3 mm, on the surface of which a recess with the shape of the outline of the electrode 7' has been made. The depth of this recess corresponds to the thickness of the electrode, namely about 0.5 mm. For this reason, the border 24 covers the entire insulating support 25.

Figure 11:
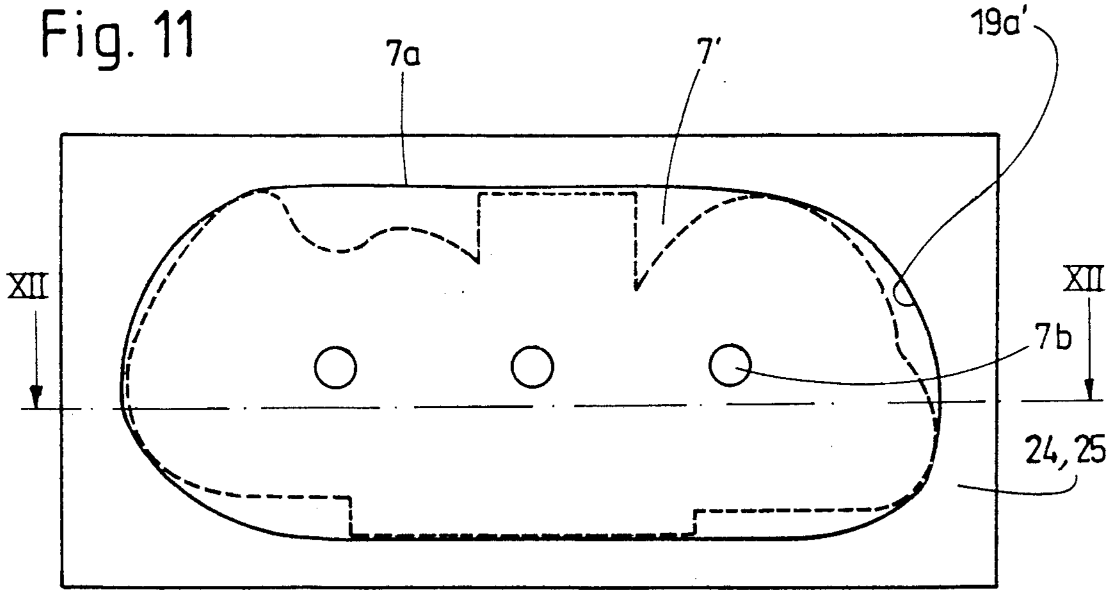
FIG. 11 is a view similar to FIG. 6 except for the fact that the shape of the electrode does not correspond exactly to the outline of the design, but to the rough periphery thereof and that the border covers the entire insulating support and forms one piece with the latter.
Figure 12:
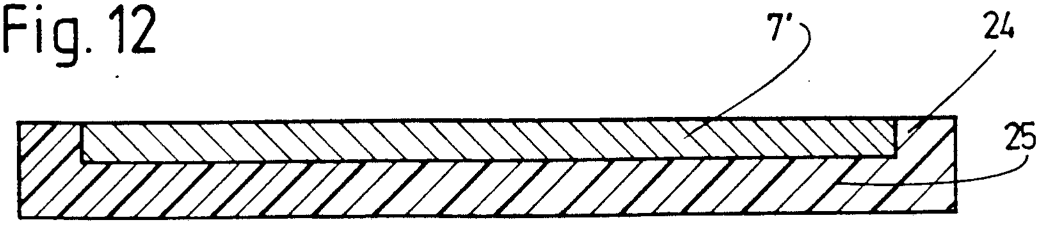
FIG. 12 is a sectional view along XII—XII of FIG. 11.

As shown in FIG. 11, the outline *7a* of the electrode 7, does not exact)y match in this case all the details of the outline of the engraved design, shown in dotted lines, but corresponds to a rougher periphery 19*a'*.

Of course, these plants are only exemplary embodiments and, instead of only the plastic plate 4 moving in the two direction F2, F3, the original plate 19 and the entire plate-carrying device together with the jack 11 and the electrode 7, 7' may, either move in a horizontal direction F2 or F3, and in this case the plastic plate 4 is displaceable in the other direction F3 or F2, or move in both directions, and thus the plastic plate 4 is fixed. Moreover, the heating and cooling devices 8, 18 may be of another type.

The method will be described with the aid of the plant according to FIGS. 8 to 12.

A metal original plate 19 is prepared, this plate having on it engraved lines of varying depths constituting the design to be reproduced, and it is fixed to the plate carrier consisting of the heating and cooling device 18 by means of the insulating plate 6'.

A copper sheet forming the electrode 7' is prepared, this sheet being cut according to the periphery of the design, and it is fixed in the hollow of the insulating support 25 in such a way that it is surrounded by the border 24 (FIG. 11).

A plastic plate 4 made of material being thermoformable by means of molding and compression, for example COBEX P.V.C., and having practically the same dimensions as the intaglio printing plate required, is prepared. This plastic plate 4 is arranged in the sliding frame 3 and held in position by adjustable clamps 3*a* enabling it to be kept uniformly tensioned inside the sliding frame 3 (FIG. 1). By means of two sliding frames 2 and 3, the plastic plate 4 is brought into a first adjusted position which corresponds to the position of the first impression 23 (FIG. 1). In this position, the zone to be deformed by molding is located between the electrode 7, and the original plate 19 which is located vertically above the electrode 7'.

The electrode 7' as well as the original plate 19 which itself forms an electrode are, in the raised position of the original plate 19, preheated by circulating hot water through the two devices 8, 18 until these electrodes reach a temperature of between 40 and 50° C., in particular 45° C., which generally takes about 2 minutes. This preheating operation enables a better quality impression to be obtained, since the problems of varying expansion of elements in contact are avoided, expansion which could adversely affect the impression.

Once the preheating temperature is reached, the original plate 19 is lowered, by means of the jack 11, until it is in contact with the plastic plate 4 and, while applying a slight pressure of the order of 5 $kg/cm^2$, the high-frequency field is applied via the two electrodes until the plastic plate 4 reaches a temperature of about 200° C. To this end, a frequency of, for example, 27 MHz applied for 15 to 20 seconds is used. Tests carried out have shown that the electrodes, the insulating support 25 and the insulating border 24 reach a temperature of only 40° to 50° C. The temperature of 200° C. of the plastic plate 4 is higher than that used with the methods known hitherto and enables a lower pressure to be subsequently applied, thereby preventing deformation around the actual impression zone.

Once this temperature is obtained, the pressure to obtain the impression, for example of the order of 20 to 25 $kg/cm^2$, i.e. 5 to 10 times less than for known methods, is exerted by means of the jack 11, the power supply of the electrodes is interrupted while maintaining this molding pressure and the original plate 19, as well as the plastic plate 4, are cooled by circulating cold water in the devices 8, 18. When the original plate 19 has reached room temperature, i.e. about 20° C., which takes roughly 2 to 2.5 minutes, the pressure is released and the original plate 19 is separated from the plastic plate 4 by raising the plate-carrying device 18. The operations to produce a single impression thus take about 5 minutes.

Then, the plastic plate 4 is moved into a second adjusted position, displacement being effected either in the direction F2 or in the direction F3, and the same operations as above are restarted in order to obtain the second impression and so on, until as many impressions, lines and columns as required have been applied onto the plate 4.

A mold in the form of a multiple-impression plate 4 (FIG. 1) is thus obtained. Since an engraved original plate was used, the mold obtained by the method is a positive plastic mold. Nevertheless, a negative plastic mold would be obtained using the same method, if a positive original plate which, itself, would have been reproduced using an engraved primitive plate were used.

Furthermore, where appropriate, it is possible to leave out the preheating operation.

If the plant according to FIGS. 1 to 3 is used for implementing the method, after the preheating phase, the plate-carrying device is lowered until the bottom end of the bellows of the chamber 20 comes into contact with the plastic plate 4 and an approximately 80% vacuum is created in this chamber with the aid of a device not shown. Molding under vacuum could have, under certain conditions, advantages, but is not necessary. Of course, after cooling and before mounting the original plate 19, the chamber 20 is connected to the external atmosphere.

Instead of the plate-carrying device being lowered in order to apply a compressive force on the plastic plate 4, it is possible to envisage that the plate carrier is fixed and that the electrode 7 with its support are raised in order to apply the pressure.

I claim:

1. A plant for manufacturing a mold in the form of a multiple-impression plastic plate for reproducing intaglio printing plates, using an original plate (19) made of metal and bearing an engraved or embossed design, said plant comprising: a structure (1) provided with an electrode-carrying device (6, 8; 8, 26) for supporting a first plate electrode (7) having an edge, and with a plate-carrying device (13 to 18) for supporting said original plate (19) at a distance from and opposite to said first electrode (7);

said first plate electrode (7) has an outline (*7a*) which corresponds to the periphery (19*a*) of the design (19*b*) of said original plate;

said edge of said first electrode being surrounded by an insulating border (24), with the inside edge of said border having a shape corresponding to the shape of said outline and of a thickness equal to that of said first plate electrode;

said first electrode being carried by an electrode support;

said original plate (19) forming a second plate electrode, first and second electrodes being connected to a high-frequency apparatus (22); a sliding frame (3) arranged between said electrodes and being provided with means (3*a*) for supporting a plastic plate (4) made of deformable material, and having approximately the dimensions of said intaglio printing plate;

means for effecting relative displacement between said sliding frame (3) and said electrodes in two perpendicular horizontal directions (F2 and F3); and means (11, 12) for changing the distance between said electrode-carrying and plate-carrying devices.

2. The plant as claimed in claim 1, wherein the first electrode (7) and said border (24) are covered by a thin insulating layer of a rigid material (27).

3. The plant as claimed in claim 1, wherein at least one of said plate-carrying and said electrode-carrying device comprises means (8, 8*a*, 8*b*; 18, 18*a*, 18*b*) for heating and cooling.

4. The plant as claimed in claim 3, wherein the plate-carrying device comprises heating and cooling means (18, 18*a*, 18*b*) consisting of a flat metal box which is in contact with said original plate (19) and which forms the second plate electrode with the latter.

5. The plant as claimed in claim 4, wherein said electrode-carrying device comprises a support saddle (5) on which said heating and cooling means (8, 8*a*, 8*b*), are arranged, and wherein said plate-carrying device (13 to 18) is provided with displacing means (11) for displacing it vertically and applying a compressive force onto said plastic plate (4).

6. The plant as claimed in claim 5, wherein said displacing means (11) consist of a double-acting jack (11) having a piston provided with a rod and wherein a supporting plate (13) carrying said box (18) with said original plate (19) is suspended from the end of said rod (12).

7. The plant as claimed in claim 6, wherein means (16, 17) enabling adjustment of the distance between the said box (18) and the supporting plate (13) integral with the rod (12) of the piston are provided, and wherein said supporting plate (13) comprises a guiding device (14, 15).

8. The plant as claimed in claim 4, wherein an assembly consisting of said original plate (19) and said box (18) is connected by a conductor (28) to said high-frequency apparatus (22), and wherein said box (18) is mounted in an insulating manner by means of an insulating plate (6') whereas said first electrode (7) is grounded.

9. The plant as claimed in claim 8, wherein an insulating support (25) carrying said first electrode (7) and said border (24) is positioned on an insulating plate (26) fixed onto a metal plate (29), the whole being preassembled by means of countersunk-head screws (30) which are flush with the surface of said first electrode, all of these elements being fixed by means for fixing onto the said box (18), and wherein said first electrode and said border are covered by a thin layer of a rigid material.

10. The plant as claimed in claim 1, wherein said electrode support (25) and said border (24) are made of one piece consisting of a plastic sheet on the surface of which a recess with the shape of the said outline has been made.

* * * * *